United States Patent
Saito et al.

(10) Patent No.: US 6,599,324 B2
(45) Date of Patent: *Jul. 29, 2003

(54) DOCUMENT MANAGEMENT APPARATUS AND DOCUMENT MANAGEMENT PROGRAM STORAGE MEDIUM

(75) Inventors: Kazumi Saito, Kawasaki (JP); Toshimitsu Suzuki, Kawasaki (JP); Sadao Yashiro, Kawasaki (JP); Takahide Muramoto, Kawasaki (JP); Masatomo Goto, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,103

(22) Filed: Mar. 11, 1998

(65) Prior Publication Data

US 2001/0039551 A1 Nov. 8, 2001

(30) Foreign Application Priority Data

Jun. 30, 1997 (JP) .............................................. 9-173913

(51) Int. Cl.$^7$ .............................................. G06F 17/00
(52) U.S. Cl. .......................... 715/513; 705/51; 345/750; 345/751
(58) Field of Search .................... 707/513, 9, 514–516; 345/327, 328, 329, 330, 331, 332, 733, 741, 742, 743, 750–751; 713/200, 202, 166; 705/51–54; 380/255; 715/513, 514–516

(56) References Cited

U.S. PATENT DOCUMENTS

| | | | | | |
|---|---|---|---|---|---|
| 5,255,389 A | * | 10/1993 | Wang | .......................... | 707/10 |
| 5,428,729 A | * | 6/1995 | Chang et al. | ................ | 345/331 |
| 5,459,827 A | * | 10/1995 | Allouche et al. | ........... | 707/513 |
| 5,504,818 A | * | 4/1996 | Okano | ......................... | 713/166 |
| 5,515,491 A | * | 5/1996 | Bates et al. | .................. | 345/331 |

(List continued on next page.)

FOREIGN PATENT DOCUMENTS

JP        1-243172       9/1989

OTHER PUBLICATIONS

"Merriam Webster's Collegiate Dictionary, Tenth Edition." Merriam–Webster, Inc. ©1997. ISBN 0–87779–709–9 p. 701.*

Gladney, H.M., "Access Control for Large Collections", ACM Transactions on Information systems, v15, n2, Apr. 1997, pp. 154 194.*

Primary Examiner—Joseph H. Feild
(74) Attorney, Agent, or Firm—Staas & Halsey

(57) ABSTRACT

In a document management apparatus for managing perusal and editing of documents, and a document management program storage medium for storing therein a document management program to manage perusal and editing of documents, a structured document is adopted to set up an access right for each structured part of the structured document. Thus, in the event that a plurality of persons are access to a single document, access rights are suitably applied to the plurality of persons.

9 Claims, 11 Drawing Sheets

U.S. PATENT DOCUMENTS

| | | | |
|---|---|---|---|
| 5,581,682 A | * 12/1996 | Anderson et al. | 707/530 |
| 5,682,506 A | * 10/1997 | Corby, Jr. et al. | 345/419 |
| 5,835,919 A | * 11/1998 | Stern et al. | 707/515 |
| 5,872,924 A | * 2/1999 | Nakayama et al. | 709/205 |
| 5,884,035 A | * 3/1999 | Butman et al. | 709/218 |
| 5,903,646 A | * 5/1999 | Rackman | 705/51 |
| 5,941,947 A | * 8/1999 | Brown et al. | 709/225 |
| 5,944,785 A | * 8/1999 | Pommier et al. | 709/205 |
| 5,991,877 A | * 11/1999 | Luckenbaugh | 713/200 |
| 6,021,202 A | * 2/2000 | Anderson et al. | 705/54 |
| 6,040,920 A | * 3/2000 | Ichiriki | 358/403 |
| 6,041,355 A | * 3/2000 | Toga | 709/227 |
| 6,119,108 A | * 9/2000 | Holmes et al. | 705/40 |
| 6,157,915 A | * 12/2000 | Bhaskaran et al. | 705/7 |
| 6,161,113 A | * 12/2000 | Mora et al. | 707/505 |
| 6,209,004 B1 | * 3/2001 | Taylor | 707/500 |
| 6,237,099 B1 | * 5/2001 | Kurokawa | 713/200 |
| 6,275,941 B1 | * 8/2001 | Saito et al. | 713/201 |
| 6,295,513 B1 | * 9/2001 | Thackston | 703/1 |
| 6,314,409 B2 | * 11/2001 | Schneck et al. | 705/54 |
| 6,446,093 B2 | * 9/2002 | Tabuchi | 707/205 |

* cited by examiner

DOCUMENT MANAGEMENT APPARATUS AND DOCUMENT MANAGEMENT PROGRAM STORAGE MEDIUM

BACKGROUND OF THE INVENTION

1. Field of the Invention

The present invention relates to a document management apparatus for managing the perusal and editing of documents, and a document management program storage medium for storing therein a document management program to manage the perusal and editing of documents.

2. Description of the Related Art

Recently, with the advance of computer technology in the writing of documents, electronic documents are inputted through an operation of a keyboard, and the electronic documents now on writing (on inputting) are saved in the state of electronic documents per se. The electronic documents may be read out as the need arises to continue the writing (inputting) and/or proofreading. Further, it is widely performed that the completed document is also saved in the state of electronic documents per se.

It is possible that one document is created through sharing it among a plurality of persons. For instance, a volume of book is written by a plurality of persons in their cooperation, as it is considered that the writing work is performed in their cooperation in the state of electronic documents as mentioned above. In this case, there is a need to provide a protection so as to avoid such a situation that a document part, which is being preparing by a certain person or has been completed, is re-edited by another person. Alternatively, it may occur that it is not desired that a part of the document is read by other writers, for example, for the reason that such a part of the document is not yet completed.

As such, access to electronic documents established in the form of units of a single file is limited. In this case, even in a situation such that a certain writer or a certain editor is permitted in points of writing or editing on only a part of the electronic document, there arises the need to provide the writer or the editor with the access right for the electronic document in its entirety. Thus, unfortunately, such a system provides no assurance of security that any document parts except the document part permitted for the writer or the editor are not changed.

On the other hand, it may be considered that individual files are made up for document parts shared by the respective writers or the respective editors. In this case, there is associated with such a problem that it takes a great deal of time to construct the document in its entirety, and errors may easily occur.

Further, there has been proposed a scheme (Japanese Patent Application Laid Open Gazette Hei. 1-243172) in which an access right is established for area units in a memory device for storing documents, and thus even if one document is concerned, right of access is determined for each document part.

However, according to this scheme, since the access right is established in area units in the memory device, variations in length of document parts in writing or editing of a document can exceed the designated storage area for the document part or another document part in the memory device, and thus part of the accessible parts is not accessible. Therefore, this scheme is not practical.

SUMMARY OF THE INVENTION

In view of the foregoing, it is an object of the present invention to provide a document management apparatus whereby one document is accessible by a plurality of persons, while suitable access rights are established for the plurality of persons, and a document management program storage medium for storing therein a document management program having a function of establishing suitable access rights for the plurality of persons.

To accomplish the above-mentioned object, according to the present invention, there is provided a document management apparatus comprising:

a storage unit for storing a structured document;

a display editing unit for receiving an accessor ID for obtaining right of accessing to the document, displaying the document, and performing an editing operation for the document;

access right setting up means for setting up right of accessing to the document by said display editing unit for each part of the document and for each accessor ID; and access permitting means for permitting an access from said display editing unit on only structured parts of the document, for which permission of access is set up in accordance with the accessor ID entered through said display editing unit.

The present invention deals with a "structured document." A structured document, for example, is a document which may be partitioned into chapters, sections, paragraphs, etc. The above-referenced "structured part" implies, when the document is partitioned into chapters, sections, paragraphs, etc., that each structured part is to be treated the same, even if it is subjected to variations in length or content.

According to the present invention, the structured document is treated and an access right is established for each structured part of the document. This feature makes it possible to suitably set up access rights on the respective parts of the document without using a plurality of files, and even if there are variations in lengths of the sentences of the respective parts of the document.

Further, according to the document management apparatus of the present invention, the access right for each structured part of the document is established for each accessor ID. This feature permits the accessors, who access to the documents, to access only parts of the document which are necessary for the accessor, and thus makes it possible to perform a joint editing and the like by a plurality of accessors, maintaining security of the document.

In the document management apparatus according to the present invention as mentioned above, it is acceptable that said access permitting means permits a transmission of the document to said display editing unit independently of setting up of right of access for each structured part of the document, and permits a rewriting of the document stored in said storage unit into a document after edited in said display editing unit on only structured parts of the document, for which permission of access is set up in accordance with the accessor ID entered through said display editing unit.

This feature makes it possible for an accessor to refer to a document portion on which the accessor has no right to edit, for the purpose of confirmation of the context and the like.

In the document management apparatus according to the present invention as mentioned above, it is also acceptable that said access permitting means permits a transmission of the document to said display editing unit on only structured parts of the document, for which permission of access is set up in accordance with the accessor ID entered through said display editing unit.

This feature makes it possible to emphasize security, since accessors may not be able to change and/or access certain parts.

In the document management apparatus according to the present invention as mentioned above, it is also acceptable that said access right setting up means sets up right of access in association with an accessor ID and in addition directly in association with each structured part of the document stored in said storage unit.

Alternatively, it is acceptable that the document management apparatus further comprises document structure alteration means for altering a structure of the document prior to transmitting the document to said display editing unit, wherein said access right setting up means sets up an alteration format of the structure of the document for each structured part of the document and for each accessor ID by said document structure alteration means in such a manner that a structure altered document, in which the structure of the document is altered by said document structure alteration means, includes only structured parts permitted in access according to the accessor ID entered through said display editing unit.

Further, it is acceptable that the document management apparatus further comprises display format control means for controlling a display format of the document prior to displaying the document on said display editing unit, wherein said access right setting up means sets up a display format of the structure of the document for each structured part of the document and for each accessor ID by said display format control means in such a manner that a display document, in which the display format of the document is controlled by said display format control means, includes only structured parts permitted in access according to the accessor ID entered through said display editing unit.

In the document management apparatus according to the present invention as mentioned above, while it is acceptable that all the components of the apparatus are arranged in a single unitary body, it is also acceptable that said storage unit is connected via a communication network to said display editing unit.

Further, to accomplish the above-mentioned object, according to the present invention, there is provided a document management program storage medium storing therein a document management program having access right setting up means for setting up right of accessing to the document for each structured part of the document and for each accessor ID, and access permitting means for permitting an access on only structured parts of the document permitted in access according to the accessor ID entered.

In the document management program storage medium according to the present invention as mentioned above, it is acceptable that said access permitting means permits a read out or a transmission of the document independently of setting up of right of access for each structured part of the document, and permits a rewriting of the document into a document after edited on only structured parts of the document permitted in access according the accessor ID entered. Alternatively, it is acceptable that said access permitting means permits a read out or a transmission of the document on only structured parts of the document permitted in access in accordance with setting up of right of access, in association with the accessor ID entered.

Further, it is also acceptable that said document management program further comprises document structure alteration means for altering a structure of the document, and wherein said access right setting up means sets up an alteration format of the structure of the document for each structured part of the document and for each accessor ID by said document structure alteration means in such a manner that a structure altered document, in which the structure of the document is altered by said document structure alteration means, includes only structured parts permitted in access according to the accessor ID entered.

Furthermore, the said document management program further comprises display format control means for controlling a display format of the document, wherein said access right setting up means sets up a display format of the structure of the document for each structured part of the document and for each accessor ID by said display format control means in such a manner that a display document, in which the display format of the document is controlled by said display format control means, includes only structured parts permitted in access according to the accessor ID entered.

DESCRIPTION OF THE PREFERRED EMBODIMENTS

Hereinafter, there will be described embodiments of the present invention.

Figure 1:
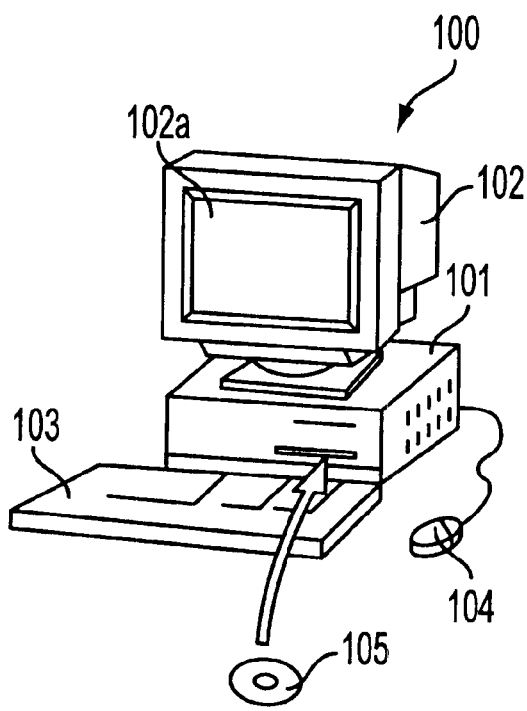
FIG. 1 is a perspective illustration of a computer system including an embodiment of a document management apparatus according to the present invention.

FIG. 1 is a perspective illustration of a computer system including an embodiment of a document management apparatus according to the present invention.

A computer system 100 comprises: a computer 101 incorporating therein a CPU, a magnetic disk, etc.; an image display unit 102 for displaying images on a display screen 102a; a keyboard 103 serving as a handler for inputting various data into the computer system 100; a mouse 104 for designating an optional position on the display screen 102a to issue various instructions to the computer system 100.

Magneto-optical disk (MO) 105, which is of kind of a portable type of storage medium, is detachably mounted on the computer 101. The computer 101 also incorporates therein MO driving units for up loading programs and data stored in the MO 105, and for down loading programs and data inside the computer 101 onto the mounted MO 105.

Figure 2:
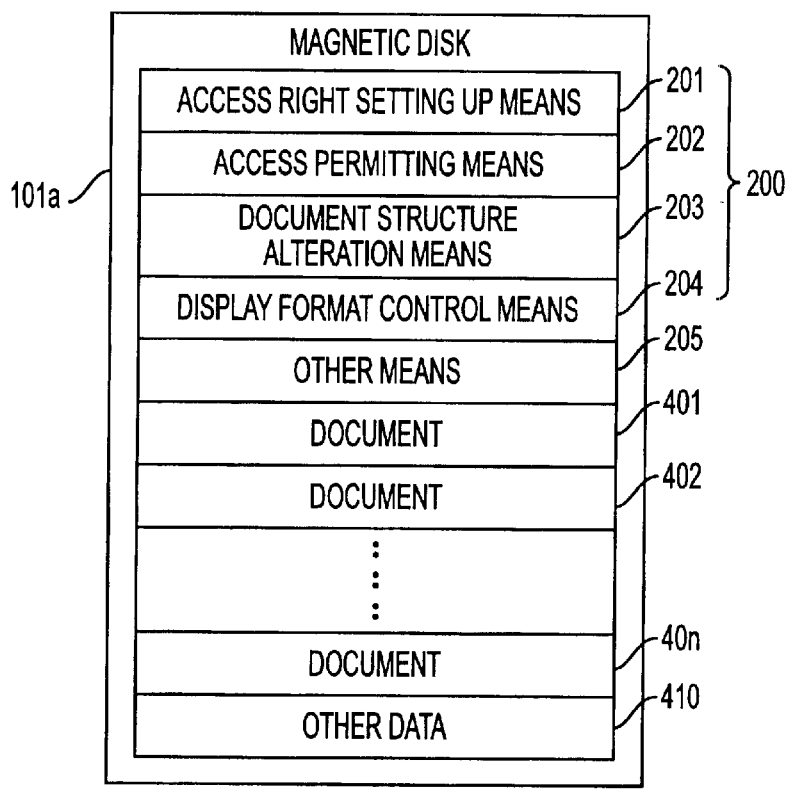
FIG. 2 is a typical illustration of a memory map for programs and data stored in a magnetic disk incorporated into the computer system shown in FIG. 1.

FIG. 2 is a typical illustration of a memory map for programs and data stored in the magnetic disk incorporated into the computer 101 of the computer system 100 shown in FIG. 1.

The magnetic disk 101a stores therein an access right setting means 201, an access permitting means 202, a document structure alteration means 203, a display format control means 204, and other means 205, and in addition stores therein a plurality of structured documents 401, 402, . . . , 40n, and other data 410.

It is noted that in the present embodiment, a program in combination of the access right setting means 201, the access permitting means 202, the document structure alteration means 203 and the display format control means 204 is referred to as a document management program 200, and the document management program 200 corresponds to a document management program referred to in the present invention, and further the magnetic disk 101' a, which stores therein the document management program 200, corresponds to an embodiment of a document management program storage medium referred to in the present invention.

Further it is noted that when the document management program 200 is stored in the Magneto-optical disk (MO) 105 shown in FIG. 1, the MO 105, which stores therein the document management program 200, also corresponds to an embodiment of a document management program storage medium referred to in the present invention.

The access right setting means 201 is for setting up right of access to a structured document for each structured part of a document for each accessor ID.

The access permitting means 202 is for permitting access to only a structured part, which is permitted in access in accordance with the entered accessor ID, of the structured document. It is acceptable that the access permitting means 202 permits read out or transmission of a document regardless of setting up of right of access to each structured part of the document, and permits a rewriting of the document into a document after editing on only a structured part, which is permitted in access in accordance with setting up of right of access to each structured part of the document, in association with the entered accessor ID. Alternatively, it is acceptable that the access permitting means 202 permits read out or transmission of a document on only a structured part, which is permitted in access in accordance with setting up of right of access to each structured part of the document, in association with the entered accessor ID.

The document structure alteration means 203 is for altering the structure of a document. The document structure alteration means 203 is not always necessary for the present invention. In the event that the document structure alteration means 203 is adopted, however, it is acceptable that the access right setting means 201 causes the document structure alteration means 203 to set up an altered way of the structure of a document for each structured part of the document for each accessor ID so that a structure altered document, which was altered in the structure of the document by the document structure alteration means 203, includes only a structured part which is permitted in access in accordance with the entered accessor ID.

The display format control means 204 is for controlling a display format of a document. The display format control means 204 is also not always necessary for the present invention in a similar to the document structure alteration means 203. In the event that the display format control means 204 is adopted, however, it is acceptable that the access right setting means 201 causes the display format control means 204 to set up a display format of a document for each structured part of the document for each accessor ID so that a display document, which was controlled in the display format of the document by the display format control means 204, includes only a structured part which is permitted in access in accordance with the entered accessor ID.

A corresponding relation between the computer system 100 shown in FIG. 1 and the document management apparatus according to the present invention is as follows.

As mentioned above, the computer system 100 incorporates a magnetic disk 101 a (cf. FIG. 2) which stores therein a plurality of structured documents 401, 402, - - - , 40n. Consequently, the magnetic disk 101a corresponds to an embodiment of the storage unit referred to in the present invention.

The computer system 100 shown in FIG. 1 further has the keyboard 103 and the mouse 104 which serve as a pointing device. Operating the pointing device makes it possible to set up an accessor ID, and to display documents on the display screen 102a of the image display unit 102. Further, an editing operation for documents is performed through operating the keyboard 103 and the mouse 104. Therefore, the keyboard 103 and the mouse 104, the image display unit 102, and complex of programs (corresponding to part of the "other means—in FIG. 2) for reception of accessors ID, display of documents, reception of editing operation for characters, and the CPU and the like of the computer 101 to execute the programs correspond to the embodiments of the display editing unit referred to in the present invention. The document management program 200 stored in the magnetic disk 101a incorporated into the computer 101, and the CPU and the like for executing the programs correspond to the access right setting up means, the access permitting means, the document structure alteration means and the display format control means, which are referred to inn the document management apparatus of the present invention. Here, it happens that the access right setting up means, the access permitting means, the document structure alteration means and the display format control means imply programs itself, alternatively imply a combination of programs and the hardware such as the CPU and the like for executing the programs.

Figure 3:
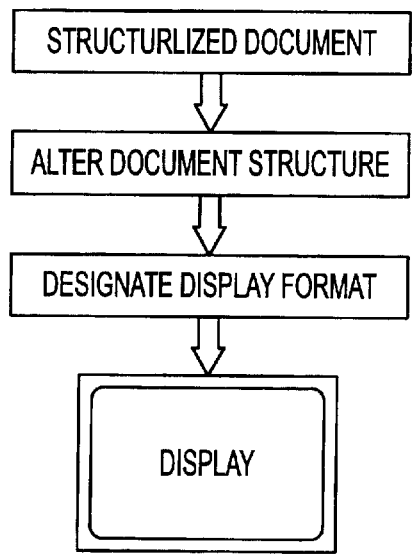
FIG. 3 is a typical illustration useful for understanding a process starting from reading a structured document stored in a storage unit up to displaying the equivalence on an image display unit.

FIG. 3 is a typical illustration useful for understanding a process starting from reading a structured document stored in a storage unit up to displaying the equivalence on an image display unit.

As mentioned above, according to the present invention, there is no need that the document management apparatus is always provided with the document structure alteration means and the display format control means. In the event that those means are adopted, however, documents stored in the storage means are displayed via the following process.

When a structured document, which is an object of the display, is read out from a storage unit, the structured document undergoes an alteration of the document structure by the document structure alteration means. What is meant by the alteration of the document structure is that for instance, in the event that the structured document stored in the storage unit has structures such as a "chapter", a "section", a "first paragraph", a "second paragraph", etc., the document is rearranged in a predetermined format in such a manner that the column of the "second paragraph" is omitted, or the column of the "first paragraph" is omitted including the sentence written therein since the contents described in the "first paragraph" are too much detail.

The document (it is referred to as a "structure altered document"), which has undergone the alteration of the document structure, undergoes a control of a display format by the display format control means. What is meant by the control of the display format is that for instance, a frame for a document display is drawn on the display screen 102a, a title is displayed with a predetermined size of characters, or a layout of display characters on the display screen 102a is determined.

Thus, the display document produced through a control of the display format is displayed on the display editing unit, so that the displayed document is edited (alteration of sentences, proofreading, etc.).

To set up access right for a structured document for each structured part, it is acceptable that right of access is set up directly in association with each structured part of the structured document. In this case, there is added restriction in access such that for example, only the structured part having right of access is permitted to be read out from the storage unit, alternatively while the full range of the structured document is permitted to be read out from the storage unit, only the structured part having-right of access is permitted to be rewritten into the storage unit.

Further, to set up right-of access to a structured document for each structured part, it is acceptable that right of access is set up at the stage of alteration of the document structure. That is, while it is permitted that the full range of the structured document is read out from the storage unit, there is practiced at the stage of alteration of the document such a processing that structured parts having no right of access are excluded from the structure altered document. Thus, since the document after alteration of the structure does not include the structured parts having no right of access, the display editing unit fails to display the structured parts having no right of access, and thus the structured parts having no right of access cannot be altered.

Furthermore, to set up right of access to a structured document for each structured part, the right of access is set up at the stage of controlling the display format of a document. Providing that the document requested is read out in its entirety from the storage unit, and structured parts of the document are altered, one without right of access to that structured part will not see the alterations. Structured parts having no right of access are not displayed on the display format, and thus structured parts cannot be altered by one having no right of access.

The explanation of a brief outline of the embodiments of the present invention is terminated with the above description, and next details of the embodiments of the present invention will be described hereinafter. Incidentally, with respect to the explanation of details of the embodiments of the present invention, it is noted that the embodiments are distinguished between a first embodiment and a second embodiment.

Figure 4:
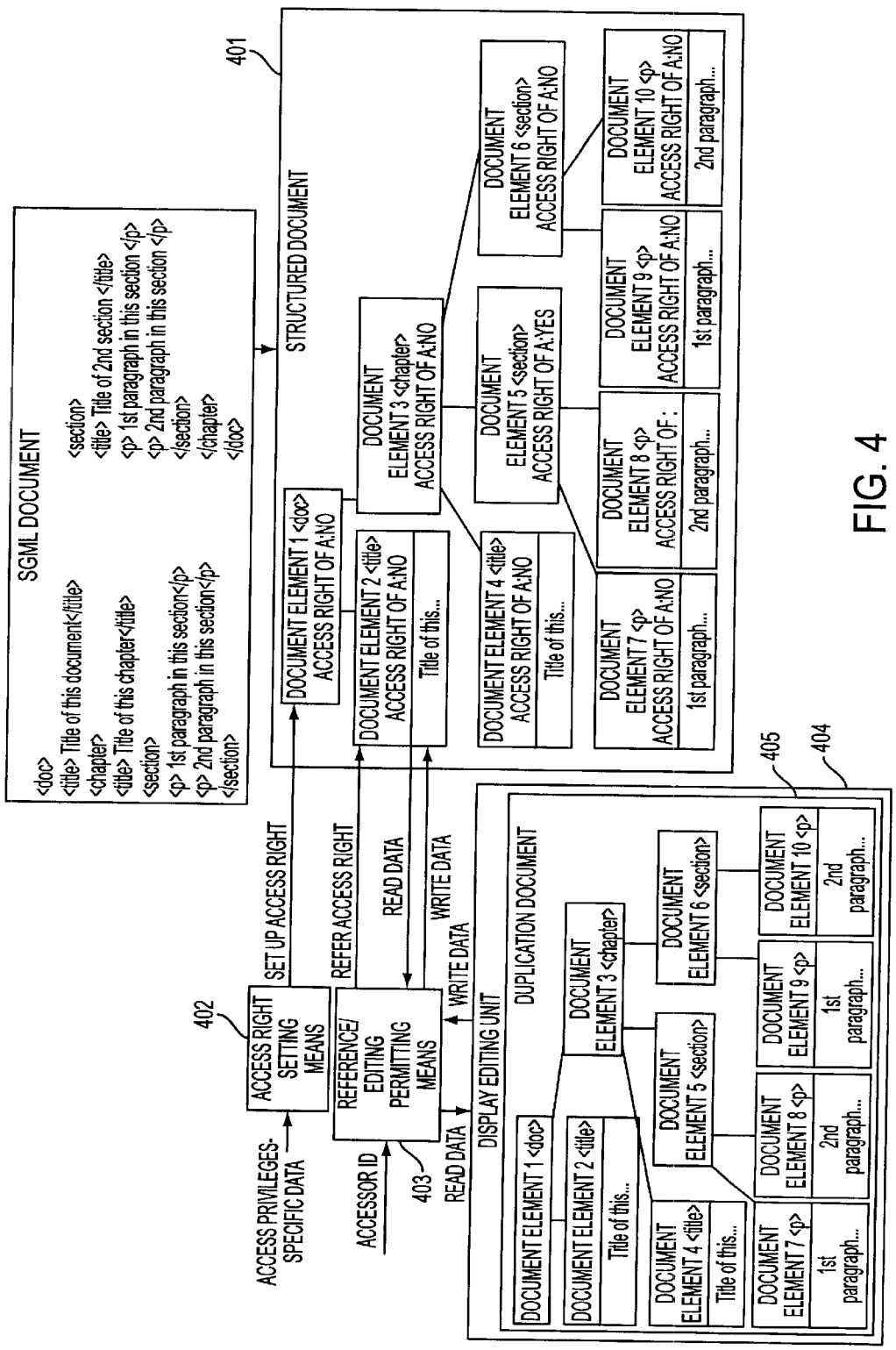
FIG. 4 is a schematic diagram showing a functional structure of a first embodiment of a document management apparatus and a document management program according to the present invention.

FIG. 4 is a schematic diagram showing a functional structure of a first embodiment of a document management apparatus and a document management program according to the present invention.

Here, as the example of the structured documents, there is adopted a SGML (Standard Generalized Markup Language) document as shown in FIG. 4. The SGML document is one of rules for defining a structure of electronic documents, and an explanation of the SGML document itself will be omitted. The SGML document has a tree structure as shown in the block of the structured document 401. As described referring to FIGS. 1 and 2, the structured document 401 is stored in the magnetic disk 101a incorporated into the computer 101 of the computer system 100. An access right setting means 402 receives access privileges-specific information inputted through the keyboard 103 shown in FIG. 1 by an access right manager who manages access right. The access privileges-specific information includes information for specifying the structured document 401 to which access right is intended to be set up, information for specifying an accessor (accessor ID), and information indicative of a distinction between a permission of access for a document element (structured part) of the structured document 401 and an inhibition of access for the document element, for the accessor: Upon receipt of the access privileges-specific information, the access right setting means 402 directly sets up permission or inhibition of access right for each document element (structured part) of the structured document 401 on the designated structured document 401' and the designated accessor as well in accordance with the entered access privileges-specific information. Here, since the SGML document having a tree structure is adopted as the structured document 401, the setting up of permission or inhibition of access right to a certain document element is also effective to document elements which are at a lower level in hierarchy, unless it is designated particularly.

The access right setting means 402 receives the access privileges-specific information as to a plurality of accessors (accessor IDs) on a single structured document 401, and sets up permission or inhibition of access right for each document element (structured part) of the structured document 401 on each of the plurality of accessors in accordance with the entered access privileges-specific information.

A display editing unit 404 displays a duplication document 405 in which the structured document 401 is copied. To display the duplication document, an accessor (referred to as accessor A) operates, for example, the keyboard 103 or the mouse 104 to request a reference/editing permitting means 403, which is an example of the access permitting means referred to in the present invention, to transmit the structured document 401 to the display editing unit 404. Then, the reference/editing permitting means 403 reads the requested structured document regardless of permission or inhibition of access right for each document element and transmits the same to the display editing unit 404 on which the document thus transmitted, that is, the duplication document 405, is displayed. Thereafter, the accessor A partially rewrites the duplication document 405. Here, it is assumed that documents of "document element 2" and "document element 8" of the duplication document 405 are altered. After changing the contents of the document, the accessor A inputs through the keyboard 103 an accessor ID assigned to oneself and requests to rewrite the "document element 2" and the "document element 8" of the structured document 401 to the sentences after the alteration to meet the changed contents of the "document element 2" and the "document element 8" of the duplication document 405. Then, the reference/editing permitting means 403 refers to access right for the entered accessor ID in connection with the structured document 401.

According to the present example, the accessor A has no access right for the document element 2, and thus the reference/editing permitting means 403 refuses rewriting on the structured document 401 by the accessor A and thereby bringing about no change in contents of the document element 2 of the structured document 401. On the other hand, with respect to the document element 8, permission or inhibition of access right for the accessor A for the document element 8 of the structured document 401 is not positively determined. But with respect to the document element 5, which is at a higher level in hierarchy in connection with the document element 8, permission of access right is set up for the accessor A. Consequently, permission of access right for the document element 5 is reflected on the document element 8, so that the reference/editing permitting means 403 overwrites the document element 8 of the duplication document 405 on the document element 8 of the structured document 401 in accordance with an instruction from the accessor A.

In case of the first embodiment shown in FIG. 4, as mentioned above, permission or inhibition of access right for each accessor ID is set up directly in association with each structured part of the structured document 401. But when the structured document 401 is read out and displayed, it is possible to read out the structured document 401 in its entirety without taking account of permission or inhibition of access right and to display the duplication document 405. However, in the event that after the duplication document 405 is rewritten, the structured document 401 is rewritten to meet the revised duplication document 405, it is investigated as to permission or inhibition of access right for the accessor for each document element, so that only document elements can be rewritten by one with access permission.

Figure 5:
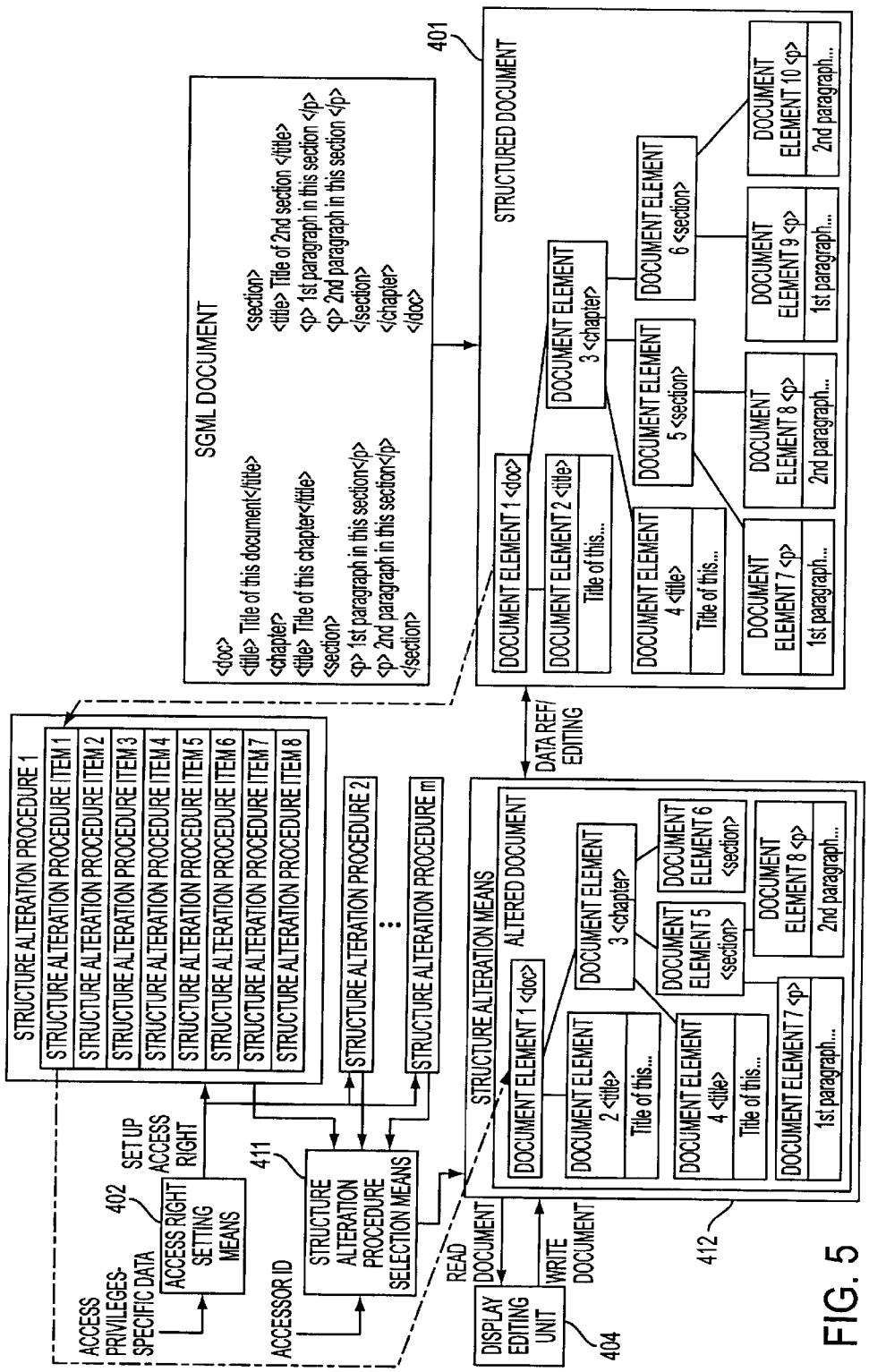
FIG. 5 is a schematic diagram showing a functional structure of a second embodiment of a document management apparatus and a document management program according to the present invention.

FIG. 5 is a schematic diagram showing a functional structure of a second embodiment of a document management apparatus and a document management program according to the present invention.

The second embodiment shown in FIG. 5 is different from the first embodiment shown in FIG. 4 in the point that a plurality of structure alteration procedures 1, 2, - - -, m, a structure alteration procedure selection means 411 and a structure alteration means 412 are added. The structure alteration procedures 1, 2, - - -, m are stored together with the structured document 401 in the magnetic disk 101a (cf. FIG. 2) incorporated into the computer 101 of the computer system 100 (cf. FIG. 1) (in FIG. 2 included in the "other data"). The structure alteration procedures 1, 2, . . . , m are optionally selected by the structure alteration procedure selection means 411. The structure alteration procedure selection means 411 controls alteration of the structure of a document in the structure alteration means 412 in accordance with the selected structure alteration procedure (here, it is assumed that the structure alteration procedure 1 is selected).

Each of the structure alteration procedures 1, 2, . . . , m comprises, as shown in connection with the structure alteration procedure 1 in FIG. 5, consists of one or a plurality of structure alteration procedure items (here 8 items). The structure alteration procedure items 1, 2, . . . are associated with the document elements 1,2, . . . of the structured document 401, respectively. Specifically, to alter the structure of documents in the structure alteration means 412, providing that the structure alteration procedure 1 is selected, the structured document 401 is read out by the structure alteration means 412, so that the document element 1 of the structured document 401 is altered in structure of the document in accordance with information shown in the structure alteration procedure item 1 of the structure alteration procedure 1. The dashed line in FIG. 5 is indicative of the association there between. An explanation for a way of alterating the structure will be omitted. The structured document 401 consists of 10 document elements, that is, document elements 1 to 10, while the structure alteration procedure 1 consists of merely 8 structure alteration procedure items, that is, the structure alteration procedure items 1 to 8, and the structure alteration procedure items corresponding to the document elements 9 and 10 are missing. This implies that in connection with alteration of the structure of documents in the structure alteration means 412, as shown inside the block of the structure alteration means 412 in FIG. 5, the document elements 9 and 10, which constitutes the structured document 401, are not included in the document after the structure is altered.

The access right setting means 402 receives access privilege specific information inputted. According to the present embodiment, permission or inhibition of access right is not directly set up on the respective document elements constituting the structured document 401. When access right is set up as to a new accessor ID, an additional frame of the structure alteration procedure is produced in association with the new accessor ID, and a structure alteration procedure item corresponding to the document element involved in "permission" of access right as to the accessor ID is written in the additional frame of the structure alteration procedure.

Next, for the actual access, an accessor ID is inputted. The accessor ID is fed to the structure alteration procedure selection means 411 to select the structure alteration procedure associated with the inputted accessor ID. On the other hand, the structured document 401 is read out by the structure alteration means 412 to alter the structure of the structured document 401 in accordance with the structure alteration procedure selected by the structure alteration procedure selection means 411. At that time, as mentioned above, the document element in which no structure alteration procedure item exists in the structure alteration procedure selected by the structure alteration procedure selection means 411, that is, the document element free from access right is omitted from the document after the structure is altered.

The structure altered document thus produced in the structure alteration means 412 is transferred to the display editing unit 404 to be displayed and undergoes editing, such as alteration of sentences. The document in which a sentence has been altered is rewritten on the structured document 401 by the structure alteration means 412. Here, document elements, which have a possibility such that they undergo alteration of a document displayed on the display editing unit 404, are restricted to only the document elements on which the accessor has access right. Consequently, even if it is intended that the document in which a sentence has been altered is rewritten on the structured document 401, the document element free from access right is not at all affected and maintains the sentence in the present form.

Figure 6:
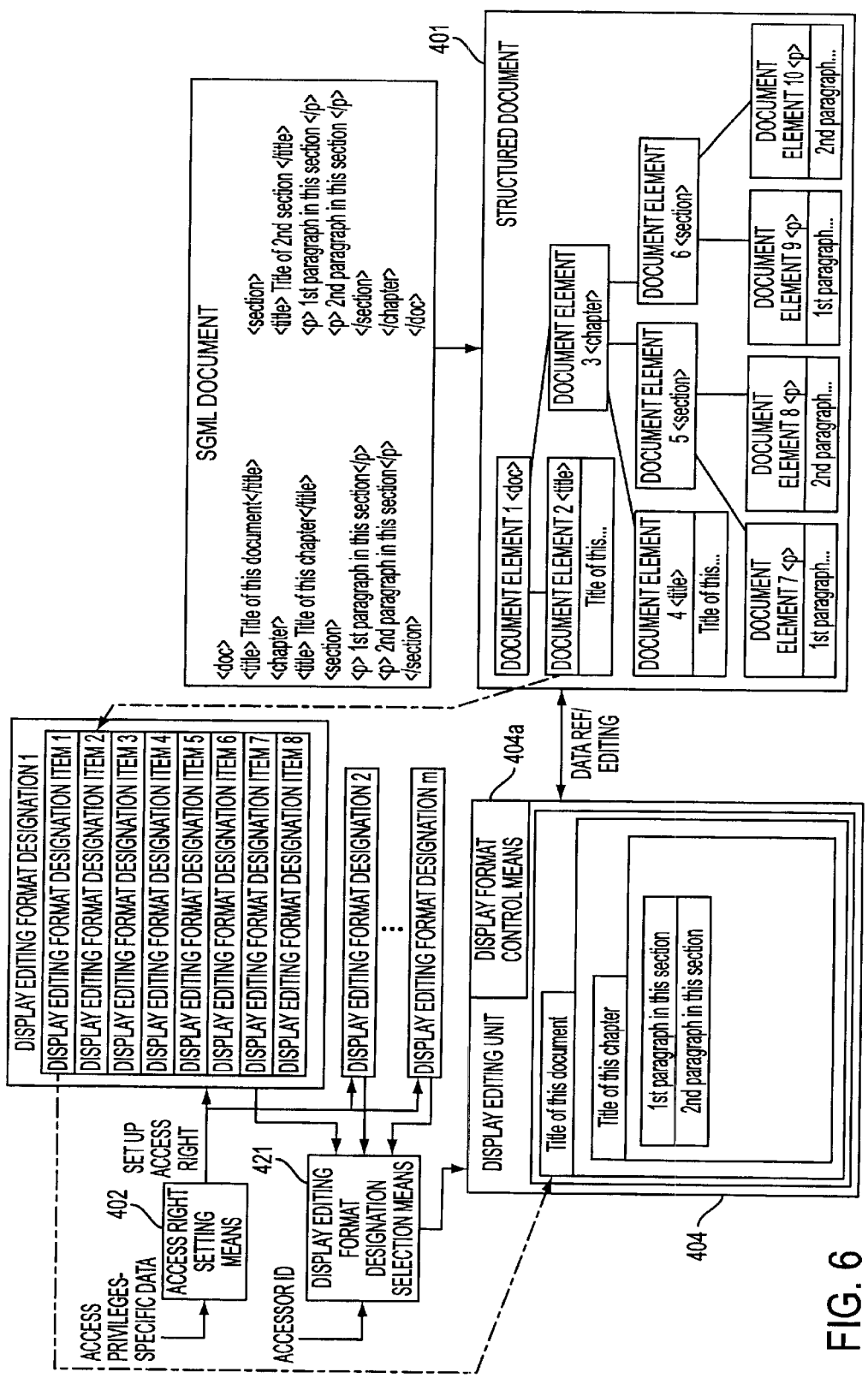
FIG. 6 is a schematic diagram showing a functional structure of a third embodiment of a document management apparatus and a document management program according to the present invention.

FIG. 6 is a schematic diagram showing a functional structure of a third embodiment of a document management apparatus and a document management program according to the present invention.

The third embodiment shown in FIG. 6 is different from the first embodiment shown in FIG. 4 in the point that a plurality of display editing format designations 1, 2, - - -, m, and a display editing format designation selection means 421 are added. The display editing format designations 1, 2, - - -, m are stored together with the structured document 401 in the magnetic disk 101a (cf. FIG. 2) incorporated into the computer 101 of the computer system 100 (cf. FIG. 1).

The display editing format designation selection means 421 optionally selects any one of the display editing format designations 1, 2, - - -, m. A display format control means 404a for controlling a display format of a document, which is provided on the display editing unit 404, determines a display format of a document in accordance with the display editing format designation (here it is assumed that the display editing format designation 1 is selected) selected by the display editing format designation selection means 421.

Each of the display editing format designations 1, 2, ..., m comprises, as shown in connection with the display editing format designation 1 in FIG. 6, consists of one or a plurality of display editing format designation items (here 8 items). The display editing format designation items 1, 2, ... are associated with the document elements 1, 2, ... of the structured document 401, respectively. Specifically, providing that the display editing format designation 1 is selected by the display editing format designation selection means 421, the structured document 401 is read out and fed to the display editing unit 404, so that the display format control means 404a, which is provided on the display editing unit 404, determines a display format of the document element 1 of the structured document 401 in accordance with information shown in the display editing format designation item 1 of the display editing format designation 1. Here, a large frame for displaying a document is displayed in association with the document element 1. Further, the display format control means 404a, which is provided on the display editing-unit 404, determines a display format of the document element 2 of the structured document 401 in accordance with information shown in the display editing format designation item 2 of the display editing format designation 1. Here, for example, characters related to the document element 2 are displayed with the largest character. The dashed line in FIG. 6 is indicative of the association there between.

The structured document 401 shown in FIG. 6 consists of 10 document elements, that is, document elements 1 to 10, while the display editing format designation 1 consists of merely 8 display editing format designation items, that is, the display editing format designation items 1 to 8, and the display editing format designation items corresponding to the document elements 9 and 10 are missing. This implies that in connection with determination of the display editing format in the display editing unit 404, the document elements 9 and 10, which constitutes the structured document 41, are not included in the display document, and as a result the document elements 9 and 10 are not displayed on the display editing unit 404. Accordingly, with respect to these two the document elements 9 and 10, it does not also happen that their sentences are altered.

The access right setting means 402 receives access privilege specific information inputted. When access right is set up as to a new accessor ID, an additional frame of the display editing format designation is produced in association with the new accessor ID, and a display editing format designation item corresponding to the document element involved in "permission" of access right as to the accessor ID is written in the additional frame of the display editing format designation.

Next, for the actual access, an accessor ID is inputted. The accessor ID is fed to the display editing format designation selection means 421 to select the display editing format designation associated with the inputted accessor ID.

The structured document 401 is read out from the magnetic disk 101a and then fed to the display editing unit 404 so that the display format control means 404a of the display editing unit 404 determines the display format of the structured document 401 in accordance with the display editing format designation selected by the display editing format designation selection means 421.

At that time, as mentioned above, the document element having no display editing format designation item exists in the display editing format designation selected by the display editing format designation selection means 421. The document element free from access right is omitted from the display document, and thus not displayed. Accordingly, a document element that is not displayed cannot be altered. The document in which a sentence has been subjected to an alteration in the display editing unit 404 is rewritten on the structured document 401. Here, document elements, which have a possibility such that they undergo alteration of a document displayed on the display editing unit 404, are restricted to only the document elements on which the accessor has access right. Consequently, even if it is intended that the document in which a sentence has been altered is rewritten on the structured document 401, the document element free from access right is not at all affected and maintains the sentence in the present form.

Next, there will be explained an embodiment in which the present invention is applied to a server and client system.

Figure 7:
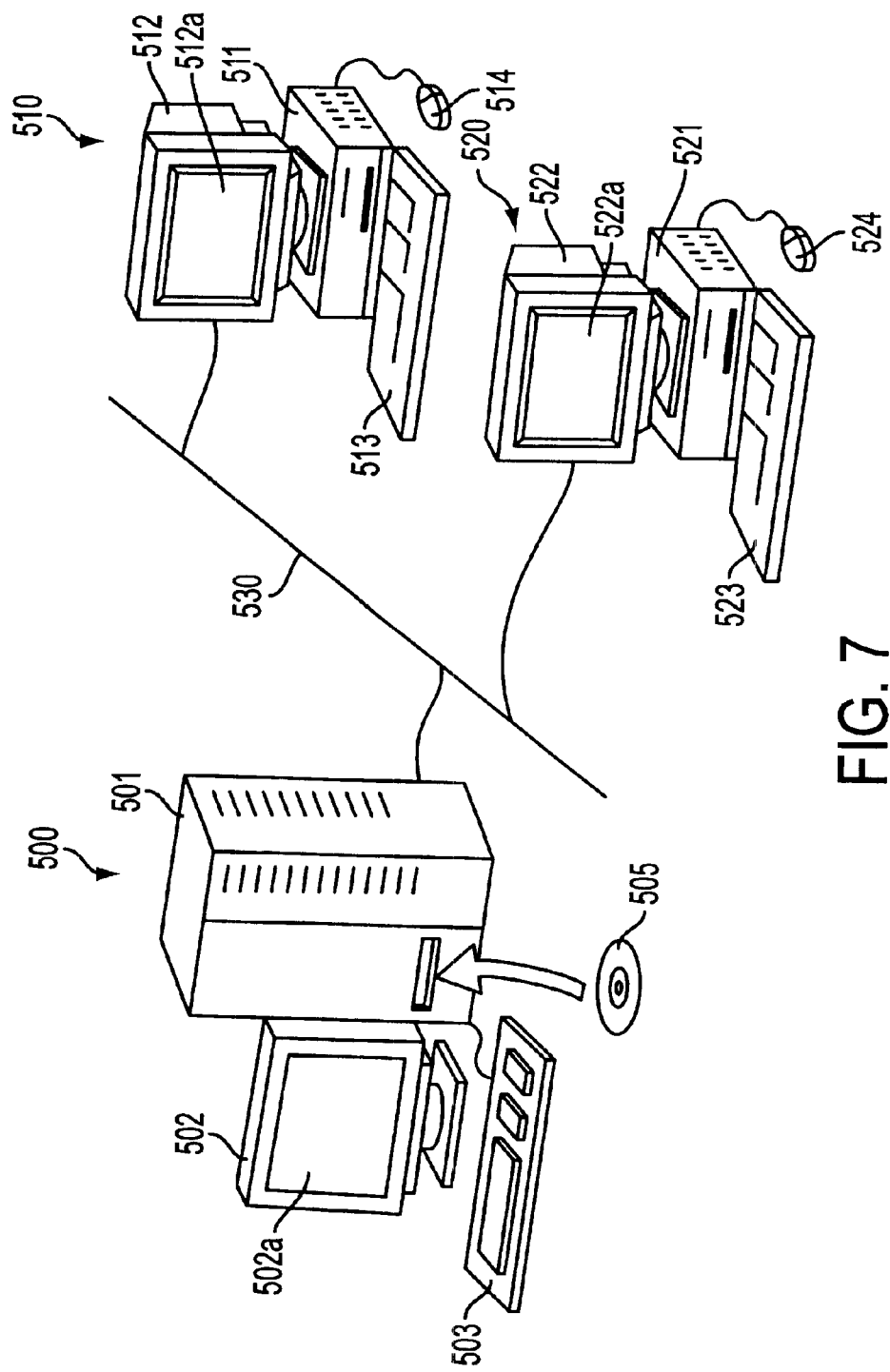
FIG. 7 is a conceptual view of a server and client system.

FIG. 7 is a conceptual view of a server and client system.

In FIG. 7, a server 500 is connected through a communication network 530 to two clients 510 and 520.

Each of the server 500 and the two clients 510 and 520 comprises a computer system. The server comprises: a main frame unit 501 incorporating therein a CPU, a magnetic disk, an MO drive for accessing an MO 505 detachably loaded, etc.; an image display unit 502 having a display screen 502a; and a keyboard 503. The clients 510 and 520 comprise: main frame units 511 and 521; image display units 512 and 522 having display screens 512a and 522a, respectively; keyboards 513 and 523; and mouses 514 and 524, respectively.

The server 500 serves as the storage unit referred to in the present invention for saving the structured documents, and also has a function of setting up access right. Each of the clients 510 and 520 serves as the display editing unit referred to in the present invention for displaying a document transmitted from the server 500 upon request and returning the document edited to the server 500.

Hereinafter, there will be explained the respective embodiments in which the server and client system is adopted. In the following embodiments, the same parts as the above-described first to third embodiments will be omitted in drawing, or simplified, and the redundant description will be omitted.

Figure 8:
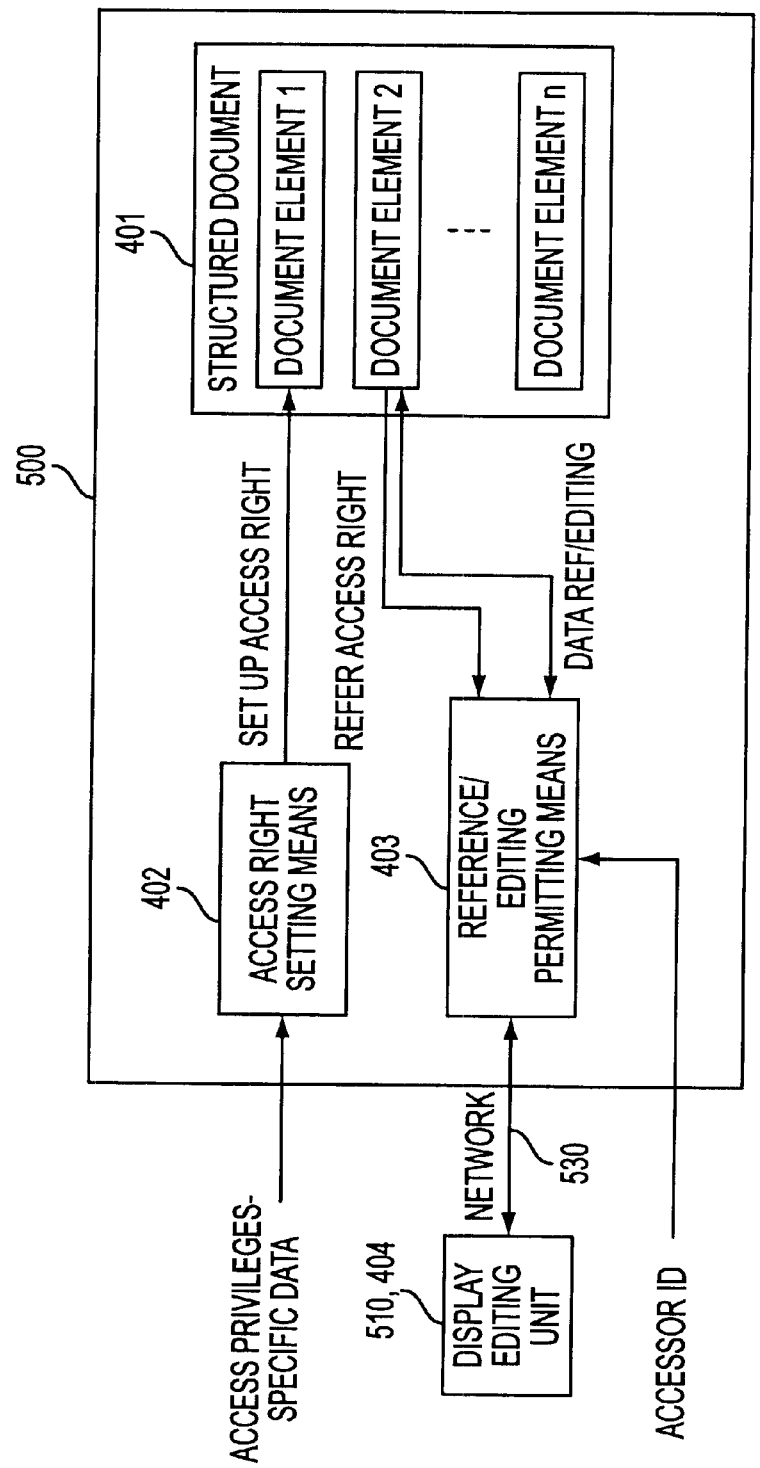
FIG. 8 is a block diagram showing an embodiment corresponding to the first embodiment shown in FIG. 4, wherein the server and client system is adopted.

FIG. 8 is a block diagram showing an embodiment corresponding to the first embodiment shown in FIG. 4, wherein the server and client system is adopted.

The server 500 stores therein the structured document 401, and has the access right setting means 402 and the reference/editing permitting means 403. On the other hand, the client 510 constitutes the display editing unit 404 by itself. The present embodiment is different from the first embodiment shown in FIG. 4 in the point that the structured document 401 read out by the reference/editing permitting means 403 is transferred via a network 530 to the display editing unit 404, and the document modified in the display editing unit 404 is returned via the network 530 to the server 500. Access privileges-specific information is inputted by an access right manager at the server 500 side. An accessor ID is inputted by an accessor at the client 510 side and is transferred via the network 530 to the server 500. Other points are similar to the first embodiment shown in FIG. 4, and the redundant description will be omitted. Incidentally, according to the first embodiment shown in FIG. 4, the structured document 401 is read out and transferred to the display editing unit 404 regardless of permission or inhibition of access rights set up to the respective document elements of the structured document 401. However, it is acceptable that only document elements involved in access right are transferred to the display editing unit 404 in accordance with access right set up to the respective document elements.

Figure 9:
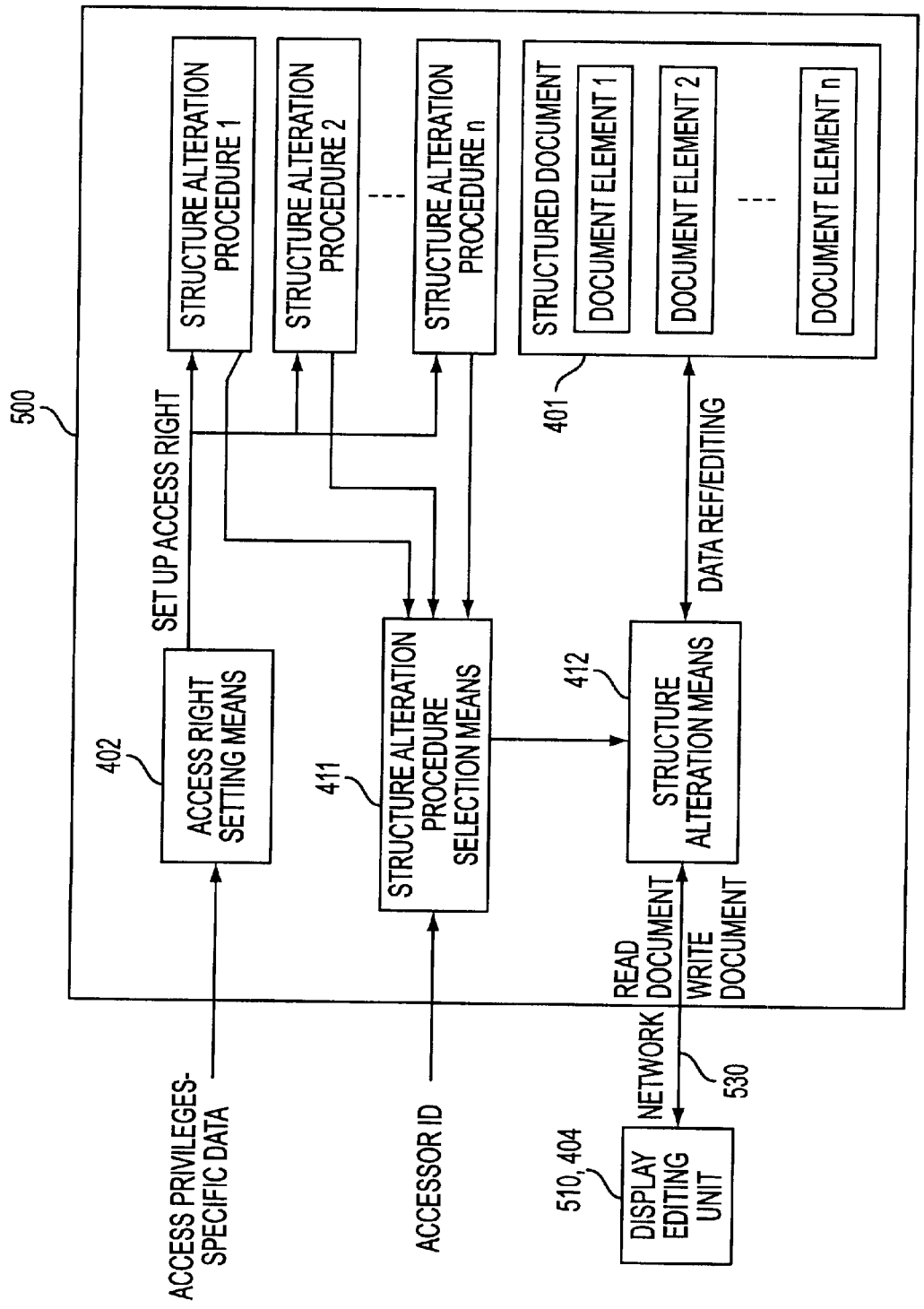
FIG. 9 is a block diagram showing an embodiment corresponding to the second embodiment shown in FIG. 5, wherein the server and client system is adopted.

FIG. 9 is a block diagram showing an embodiment corresponding to the second embodiment shown in FIG. 5, wherein the server and client system is adopted.

The server 500 stores therein the structured document 401, and has the access right setting means 402, the structure alteration procedure selection means 411 and the structure alteration means 412. On the other hand, the client 510 constitutes the display editing unit 404 by itself.

The server 500 is connected via the network 530 such as a LAN, etc. to the client 510 (the display editing unit 404). A document, in which the structure has been altered in the structure alteration means 412, is transmitted via the network 530 to the client 510 (the display editing unit 404). A document modified in the display editing unit 404 is transmitted via the network 530 to the server 500.

Access privilege-specific information is inputted by an access right manager at the server 500 side. An accessor ID is inputted at the client 510 side and is transferred via the network 530 to the server 500.

Other points are similar to the second embodiment shown in FIG. 5, and the redundant description will be omitted.

Figure 10:
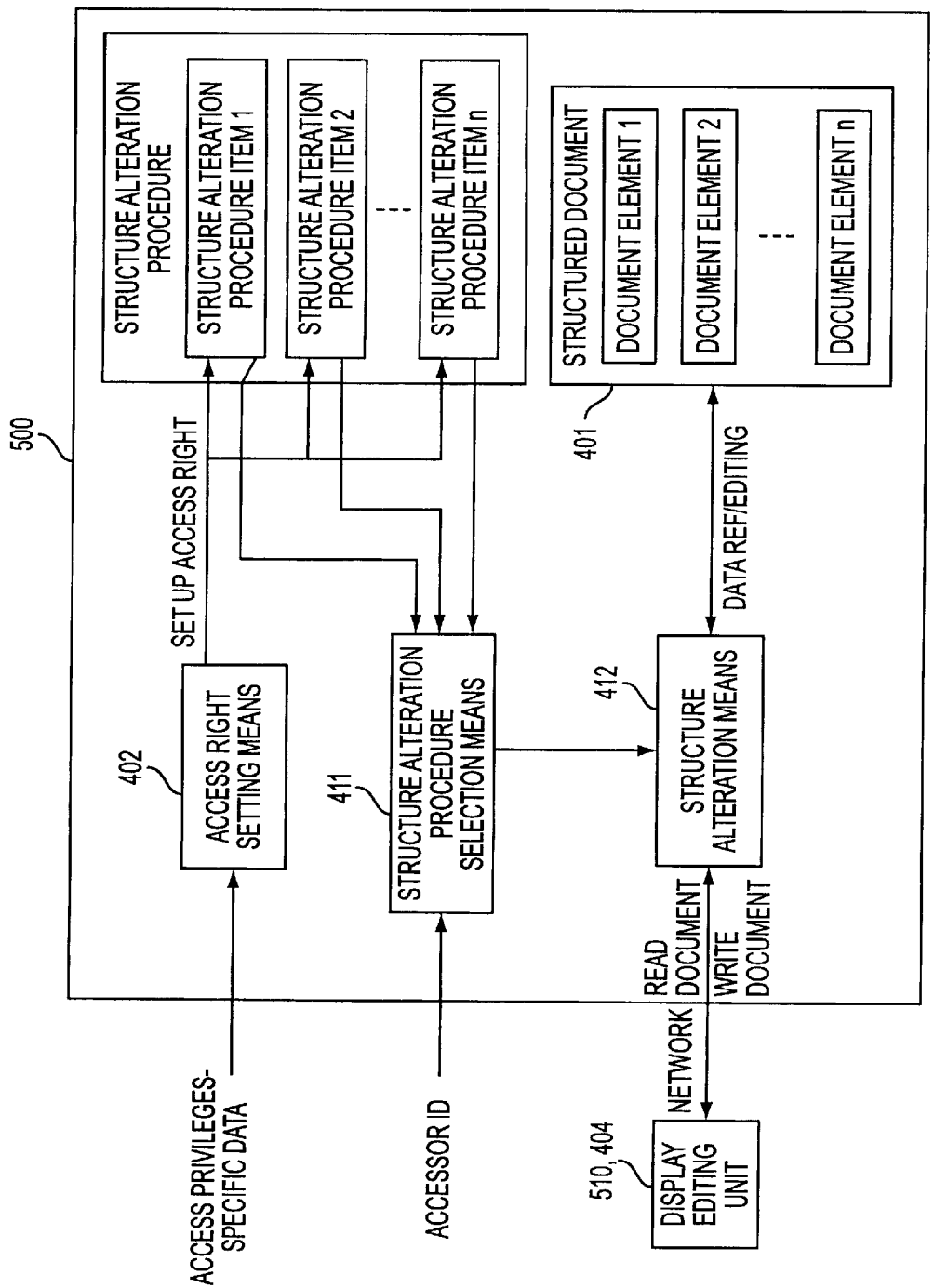
FIG. 10 is a block diagram showing a modification of the embodiment shown in FIG. 9.

FIG. 10 is a block diagram showing a modification of the embodiment shown in FIG. 9.

According to the embodiment shown in FIG. 9, as described in connection with the second embodiment shown in FIG. 5, there is established the association between the accessors ID and the structure alteration procedures on a one-to-one correspondence basis. On the other hand, according to the modified embodiment shown in FIG. 10, there is provided a single structure alteration procedure per se independently of the accessors ID. The structure alteration procedure according to the modified embodiment shown in FIG. 10 is arranged in such a manner that there is set up a flag indicative of validity or invalidity of the structure alteration procedure item for each accessor ID on each of the structure alteration procedure items 1, 2, - - - , n, which are associated with the document elements 1, 2, - - - , n, respectively. The access right setting means 402 sets up the flags in accordance with the entered access privileges-specific information.

In this condition, when an accessor ID is inputted, the structure alteration procedure selection means 411 refers to the flag associated with the entered accessor ID for the structure alteration procedure items constituting the structure alteration procedure to select only the structure alteration procedure items in which an access right "permission" is set up, and the structure alteration means 412 alters the structure of the document in accordance with the structure alteration procedure consisting of a set of the selected structure alteration procedure items.

Figure 11:
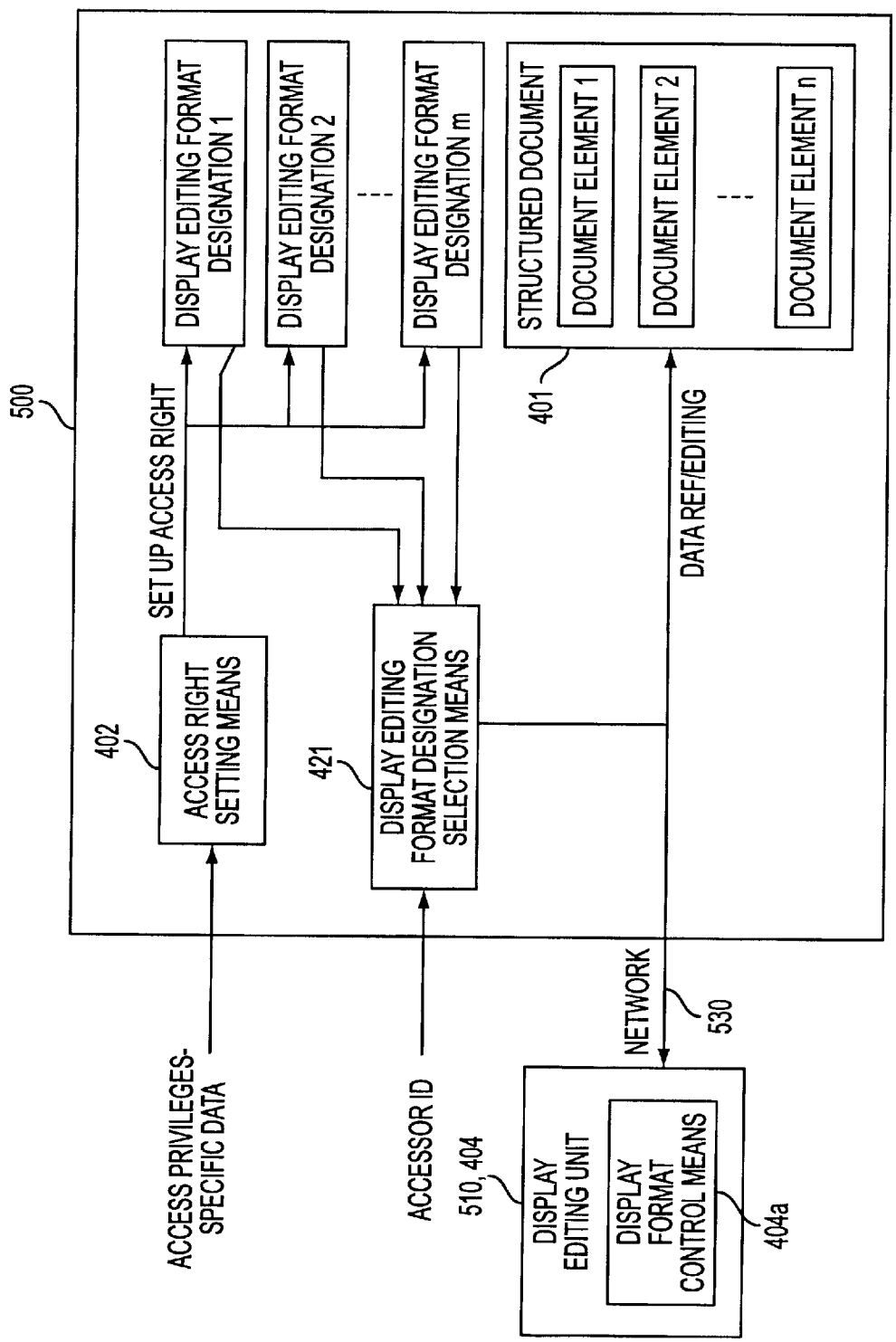
FIG. 11 is a block diagram showing an embodiment corresponding to the third embodiment shown in FIG. 6, wherein the server and client system is adopted.

FIG. 11 is a block diagram showing an embodiment corresponding to the third embodiment shown in FIG. 6, wherein the server and client system is adopted.

The server 500 stores therein the structured document 401, and has the access right setting means 402, the structure alteration procedure selection means 411 and the structure alteration means 412. On the other hand, the client 510 constitutes the display editing unit 404 by itself. The display editing unit 404 has a display format control means 404*a*. The server 500 is connected via the network 530 such as a LAN, etc. to the client 510 (the display editing unit 404). The structured document 401 is transmitted via the network 530 to the client 510 (the display editing unit 404). A display editing format designation, which is selected by the display editing format designation selection means 421 in accordance with an accessor ID, is also transmitted via the network 530 to the client 510 (the display editing unit 404). In the display editing unit 404, the display format control means 404*a* controls and displays the display format of the structured document 401 thus transmitted in accordance with the display editing format designation thus transmitted. As described in connection with the third embodiment, the display document includes only the document elements to which an accessor specified by the accessor ID is accessible. The document edited in the display editing unit 404 is transmitted via the network 530 to the server 500.

Access privileges-specific information is inputted by an access right manager at the server 500 side. An accessor ID is inputted at the client 510 side and is transferred via the network 530 to the server 500.

Other points are similar to the third embodiment shown in FIG. 6, and the redundant description will be omitted.

Figure 12:
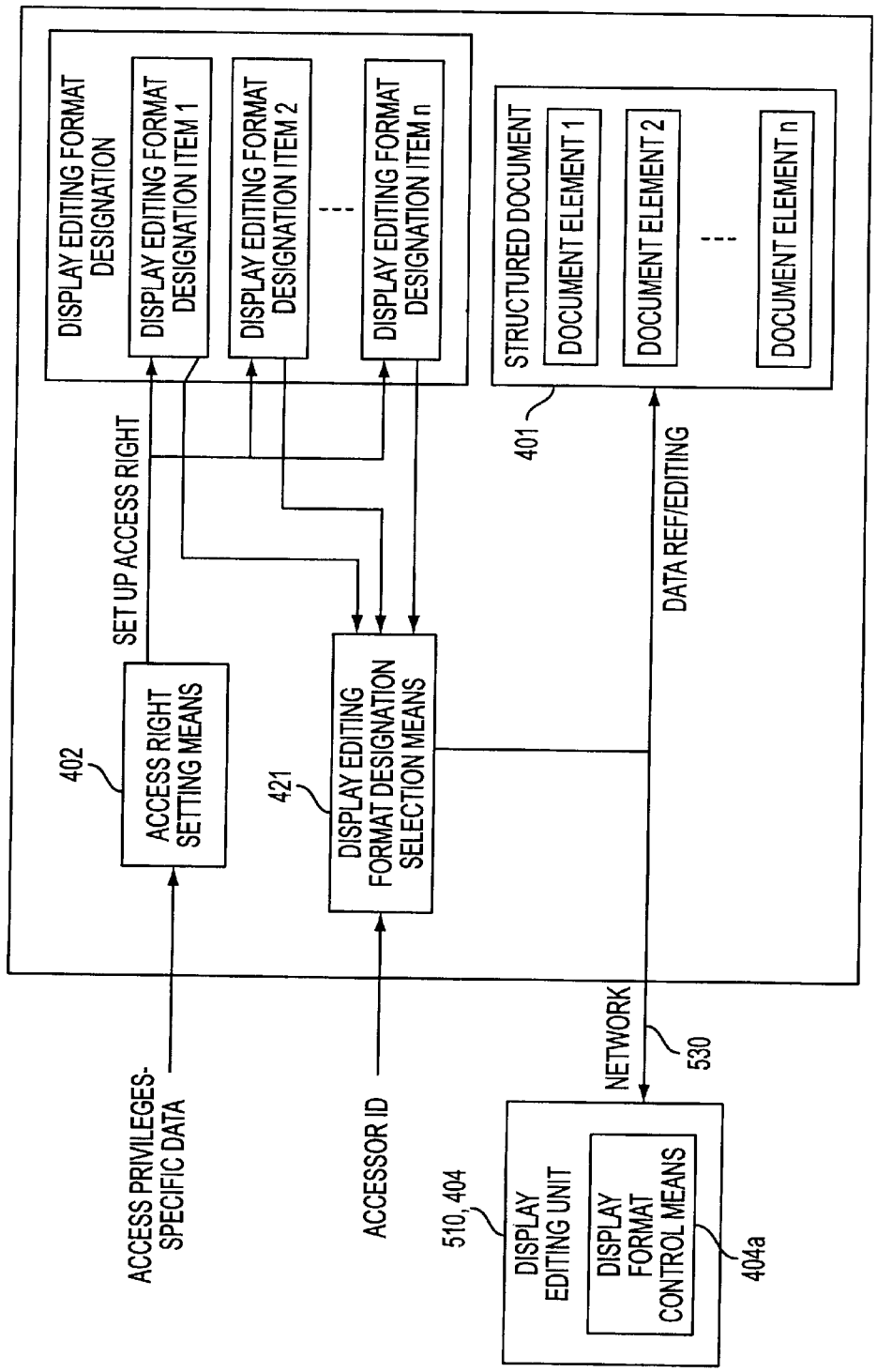
FIG. 12 is a block diagram showing a modification of the embodiment shown in FIG. 11.

FIG. 12 is a block diagram showing a modification of the embodiment shown in FIG. 11.

According to the embodiment shown in FIG. 11, as described in connection with the third embodiment shown in FIG. 6, there is established the association between the accessors ID and the display editing format designations on a one-to-one correspondence basis. On the other hand, according to the modified embodiment shown in FIG. 12, there is provided a single display editing format designation independently of the accessors ID. The display editing format designation according to the modified embodiment shown in FIG. 12 is arranged in such a manner that there is set up a flag indicative of validity or invalidity of the display editing format designation item for etch accessor ID on each of the display editing format designation items 1, 2, - - - , n, which are associated with the document elements 1, 2, - - - , n, respectively. The access right setting means 402 sets up the flags in accordance with the entered access privileges-specific information.

In this condition, the display editing format designation selection means 421-refers to the flag associated with the entered accessor ID for the display editing format designation items constituting the display editing format designation to select only the display editing format designation items in which an access right "permission" is set up, and the display editing format designation selection means 421 transmits together with the structured document 401 the display editing format designation consisting of a set of the selected display editing format designation items via the network 530 to the client 510 (the display editing unit 404).

As explained above, according to the present invention, in the event that a plurality of persons access to a single document, it is possible to suitably apply access rights to the plurality of persons.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A document management apparatus, comprising:
    a storage unit for storing a single file containing a structured document containing structured parts;
    a display editing unit receiving an accessor ID for obtaining rights of data transfer with the document, displaying the document, and performing an editing operation for the document;
    access right setting up means for setting up rights of data transfer with the document by said display editing unit for each structured part of the document and for each accessor ID;
    access permitting means for permitting data transfer with said display editing unit to only structured parts of the document that have access permission set up in accordance with the accessor ID entered using said display editing unit, wherein said access permitting means permits:
        a transmission of the document to said display editing unit independently of setting up of rights of access for each structured part of the document, and
        permits a rewriting of the document stored in said storage unit into a document after the document is edited in said display editing unit,
        wherein the rewriting is performed on only structured parts of the document that have access permission set up in accordance with the accessor ID entered using said display editing unit for the respective structured part.

2. A document management apparatus according to claim 1, wherein said access right setting up means sets up rights of access in association with an accessor ID directly in association with each structured part of the document stored in said storage unit.

3. A document management apparatus according to claim 1, wherein said storage unit is connected via a communication network to said display editing unit.

4. A document management apparatus, comprising:
    a storage unit for storing a single file containing a structured document containing structured parts;
    a display editing unit receiving an accessor ID for obtaining rights of data transfer with the document, displaying the document, and performing an editing operation for the document;
    access right setting up means for setting up rights of data transfer with the document by said display editing unit for each structured part of the document and for each accessor ID;
    access permitting means for permitting data transfer with said display editing unit to only structured parts of the document that have access permission set up in accordance with the accessor ID entered using said display editing unit; and
    document structure alteration means for altering a structure of the document prior to transmitting the document to said display editing unit,
    wherein said access right setting up means sets up an alteration format of the structure of the document for each structured part of the document and for each accessor ID by said document structure alteration means so that a document altered by said document structure alteration means includes only structured parts having access permission according to the accessor ID entered through said display editing unit.

5. A document management apparatus, comprising:
    a storage unit for storing a single file containing a structured document containing structured parts;
    a display editing unit receiving an accessor ID for obtaining rights of data transfer with the document, displaying the document, and performing an editing operation for the document;
    access right setting up means for setting up rights of data transfer with the document by said display editing unit for each structured part of the document and for each accessor ID;
    access permitting means for permitting data transfer with said display editing unit to only structured parts of the document that have access permission set up in accordance with the accessor ID entered using said display editing unit; and
    display format control means for controlling a display format of the document prior to displaying the document on said display editing unit,
    wherein said access right setting up means sets up a display format of the structure of the document for each structured part of the document and for each accessor ID by said display format control means so that a display document, in which the display format of the document is controlled by said display format control means, includes only structured parts permitted access according to the accessor ID entered through said display editing unit.

6. A computer readable storage medium storing a document management program managing a single file containing a structured document containing structured parts, the program instructing a computer to perform:
    setting up rights of data transfer with each structured part of the document for each accessor ID; and
    permitting an access on only structured parts of the document permitted in access according to the respective accessor ID,
    wherein said permitting permits a read out or a transmission of the document independently of setting up of rights of access for each structured part of the document, and permits a rewriting of the document into a document after edited on only structured parts of the document permitted in access according the respective accessor ID.

7. The computer readable storage medium according to claim 6, wherein the setting up rights of data transfer includes designating a write right, and the permitting an access includes allowing writing to a respective section only by parties designated a write right.

8. A computer readable storage medium storing a document management program managing a single file containing a structured document containing structured parts, the program instructing a computer to perform:
    setting up rights of data transfer with each structured part of the document for each accessor ID;
    permitting an access on only structured parts of the document permitted in access according to the respective accessor ID; and
    altering a structure of the document, wherein said the setting up sets up an alteration format of the structure of the document for each structured part of the document and for each accessor ID in such a manner that a structure altered document includes only structured parts having access permission according to the respective accessor ID.

9. A computer readable storage medium storing a document management program managing a single file containing a structured document containing structured parts, the program instructing a computer to perform:

setting up rights of data transfer with each structured part of the document for each accessor ID;

permitting an access on only structured parts of the document permitted in access according to the respective accessor ID; and controlling a display format of the document, wherein the setting up sets up a display format of the structure of the document for each structured part of the document and for each accessor ID in such a manner that the display format of a display document includes only structured parts having access permission according to the respective accessor ID.

* * * * *

UNITED STATES PATENT AND TRADEMARK OFFICE
CERTIFICATE OF CORRECTION

PATENT NO. : 6,599,324 B2
DATED : July 29, 2003
INVENTOR(S) : Schumann et al.

It is certified that error appears in the above-identified patent and that said Letters Patent is hereby corrected as shown below:

Column 14,
Line 29, "he amount" should read -- the amount --

Signed and Sealed this

Twenty-eighth Day of December, 2004

JON W. DUDAS
*Director of the United States Patent and Trademark Office*